US007003053B2

(12) United States Patent
Hitomi et al.

(10) Patent No.: US 7,003,053 B2
(45) Date of Patent: Feb. 21, 2006

(54) DIGITAL BROADCAST RECEIVER

(75) Inventors: Akihiko Hitomi, Osaka (JP); Akio Inoue, Nara (JP); Yoshikazu Otsubo, Hirakata (JP); Takayuki Hamabata, Nara (JP)

(73) Assignee: Sanyo Electric Co., Ltd., Moriguchi (JP)

( * ) Notice: Subject to any disclaimer, the term of this patent is extended or adjusted under 35 U.S.C. 154(b) by 767 days.

(21) Appl. No.: 09/996,765

(22) Filed: Nov. 30, 2001

(65) Prior Publication Data

US 2002/0067776 A1 Jun. 6, 2002

(30) Foreign Application Priority Data

Dec. 4, 2000 (JP) ............................ 2000-369197

(51) Int. Cl.
*H04L 25/00* (2006.01)

(52) U.S. Cl. ...................................... 375/316; 375/217

(58) Field of Classification Search ................ 375/240, 375/240.01, 316, 240.24, 340, 260, 345, 375/295, 217, 216; 331/177 R, 178, 179; 348/222, 177, 180, 192, 570; 725/105, 131, 725/143, 151, 96; 381/3, 4, 5, 6, 7

See application file for complete search history.

(56) References Cited

U.S. PATENT DOCUMENTS 5,050,237 A * 9/1991 Ecklund .................. 455/200.1
5,896,177 A * 4/1999 Hwang ....................... 348/445

FOREIGN PATENT DOCUMENTS

| | | |
|---|---|---|
| JP | 5-48395 | 2/1993 |
| JP | 7-231269 | 8/1995 |
| JP | 2001-285103 | 10/2001 |

OTHER PUBLICATIONS

Office Action (Japanese Patent Office)—mailed Nov. 24, 2004, Not in English.

* cited by examiner

*Primary Examiner*—Mohammed Ghayour
*Assistant Examiner*—Pankaj Kumar
(74) *Attorney, Agent, or Firm*—Armstrong, Kratz, Quintos, Hanson & Brooks, LLP.

(57) ABSTRACT

The invention provides a digital broadcast receiver which comprises a tuner 1 for selecting the desired broadcasting station from among a plurality of broadcasting stations, a demodulator circuit 3 for decoding a plurality of bit frames constituting the digital broadcast of the selected station, and a control circuit 4 for controlling the operation of the tuner and the demodulator circuit. With one broadcasting station selected, the control circuit 4 stops decoding at least one of the bit frames, and searches for other broadcasting station or stations of satisfactory reception condition utilizing free time resulting from stopping decoding. Upon the reception condition becoming impaired, the station being received is changed over to the station of satisfactory reception condition by the control circuit 4.

7 Claims, 5 Drawing Sheets

DIGITAL BROADCAST RECEIVER

FIELD OF THE INVENTION

The present invention relates to digital broadcast receivers which can be mounted on mobile bodies such as motor vehicles and which are adapted to receive digital broadcast signals transmitted from a plurality of broadcasting stations.

BACKGROUND OF THE INVENTION

As digital audio broadcasts for mobile bodies, DAB (Digital Audio Broadcast) systems have been introduced into actual use in recent years wherein digital audio signals are encoded with a high efficiency and modulated by OFDM (Orthogonal Frequency Division Multiplexing). Studies are also underway on IBOC (In-Band On-Channel) digital broadcasts which utilize the same frequency band as the existing analog audio broadcasts.

For the transmission of digital audio signals, studies are undertaken, for example, to allocate a digital carrier to a frequency band not in use and included within the range of regulation frame R concerning the frequencies and signal strengths assigned to the existing analog FM broadcasts as shown in FIG. 2(*a*). In this case, digital audio broadcast signals are transmitted in a transmission spectrum format shown in FIG. 2(*b*). Stated more specifically, the single bit stream providing a digital audio signal is divided into units of bits to form a plurality of (e.g., four) bit frames A, B, C and D as shown in FIG. 3. Different carrier frequencies are then allocated to the respective bit frames, which are arranged on the frequency axis as illustrated in FIG. 2(*b*). These bit frames A, B, C and D are transmitted cyclically with time differences.

The receiver receives the bit frames A, B, C and D and demodulates these bit frames to reproduce audio data. Processing the bit frames A, B, C and D individually for reproduction involves some degradation of audio quality, but the same contents as the original bit stream can then be retained.

In the above mode of digital audio broadcast for mobile bodies, the movement of the mobile body carrying the receiver is likely to entail an impaired reception condition. The user then needs to switch the current broadcasting station to some other station providing a better reception quality, hence a problem of cumbersome procedure.

SUMMARY OF THE INVENTION

Accordingly, an object of the present invention is to provide a digital broadcast receiver which is so adapted that in the case where the reception condition has become impaired, the broadcasting station being received can be automatically changed over to other station of better reception condition.

The present invention provides a receiver for receiving a digital broadcast having a transmission spectrum format which is prepared by dividing digital data comprising a single bit stream into a plurality of bit frames capable of holding the same contents as the original bit stream, allocating different carrier frequencies to the respective bit frames and arranging the bit frames on a frequency axis.

The digital broadcast receiver of the invention comprises a tuner for selecting the desired broadcasting station from among a plurality of broadcasting stations and receiving the digital broadcast of the selected station, a demodulator circuit for decoding a plurality of bit frames constituting the received digital broadcast and outputting the decoded bit frames and a control circuit for controlling the operation of the tuner and the demodulator circuit, the control circuit comprising:

decoding control means for stopping decoding at least one of the plurality of bit frames, with one broadcasting station selected, search means for searching for other broadcasting station or stations of satisfactory reception condition utilizing free time resulting from stopping decoding, and selected station changeover means for changing over the broadcasting station being selected for reception to the broadcasting station of satisfactory reception condition searched for.

The digital broadcast receiver of the present invention usually decodes all the bit frames received for reproducing digital signals. However, in preparation for a changeover to other broadcasting station of satisfactory reception condition in the event of an impaired reception condition, the receiver stops decoding at least one of the bit frames at a suitable time, and the resulting free time is utilized for searching for other broadcasting station of satisfactory reception condition.

Even if the decoding of at least one of the bit frames is discontinued, the broadcast data can be reproduced with the same contents as originally by decoding at least one of the remaining bit frames.

In the event of the reception condition becoming impaired, the broadcast station being selected for reception is changed over to the station of satisfactory reception condition detected by the search. The impairment of reception condition can be detected, for example, in terms of an error rate of reception data exceeding a predetermined threshold value. When an impaired reception condition is detected, changeover command means brings the decoding control means, the search means and the selected station changeover means into operation.

Stated more specifically, the control circuit further comprises register means for storing frequency data as to the other broadcasting stations of satisfactory reception condition detected by the search, and the changeover command means reads the frequency data as to one broadcasting station from the register means and operates the changeover means.

Further stated more specifically, the changeover command means of the control circuit operates the decoding control means and the search means in accordance with a manipulation by the user or when a slightly impaired reception condition is detected by the sensor means to cause the register means to store the result of search.

According to another specific construction, the control circuit further comprises memory means for storing received frequency data as to one or a plurality of substitute stations inserted in the broadcast signal being received, and the search means searches for the substitute station of satisfactory reception condition from among the said one or plurality of substitute stations having the received frequency data stored in the memory means. In the event of impairment of reception condition, therefore, the broadcast of the station being received is changed over to another station which can be substituted. This diminishes the discomfort due to the change of station.

According to another specific construction, the control circuit comprises station sensor means for detecting other broadcasting station or stations broadcasting the same program as that being broadcast based on program identifying data inserted in the broadcast signal being received, and memory means for storing received frequency data as to the other broadcasting station or stations detected, and the search means searches for the broadcasting station of satisfactory reception condition from among the broadcasting station or stations having the received frequency data stored in the memory means. In the event of impairment of reception condition, therefore, the station being received is changed over to another station broadcasting the same program. Thus, the same program can be enjoyed continuously.

As described above, the digital broadcast receiver embodying the present invention is adapted to automatically change over the broadcasting station being received to other station of satisfactory reception condition in the event of impairment of reception condition. The user therefore need not perform the cumbersome procedure of searching for other broadcasting station of satisfactory reception condition.

DETAILED DESCRIPTION OF EMBODIMENT

Figure 1:
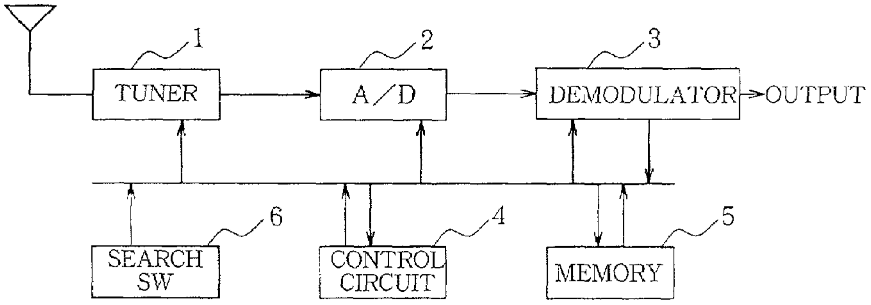
FIG. 1 is a block diagram showing the construction of a DAB receiver embodying the invention.
Figure 2:
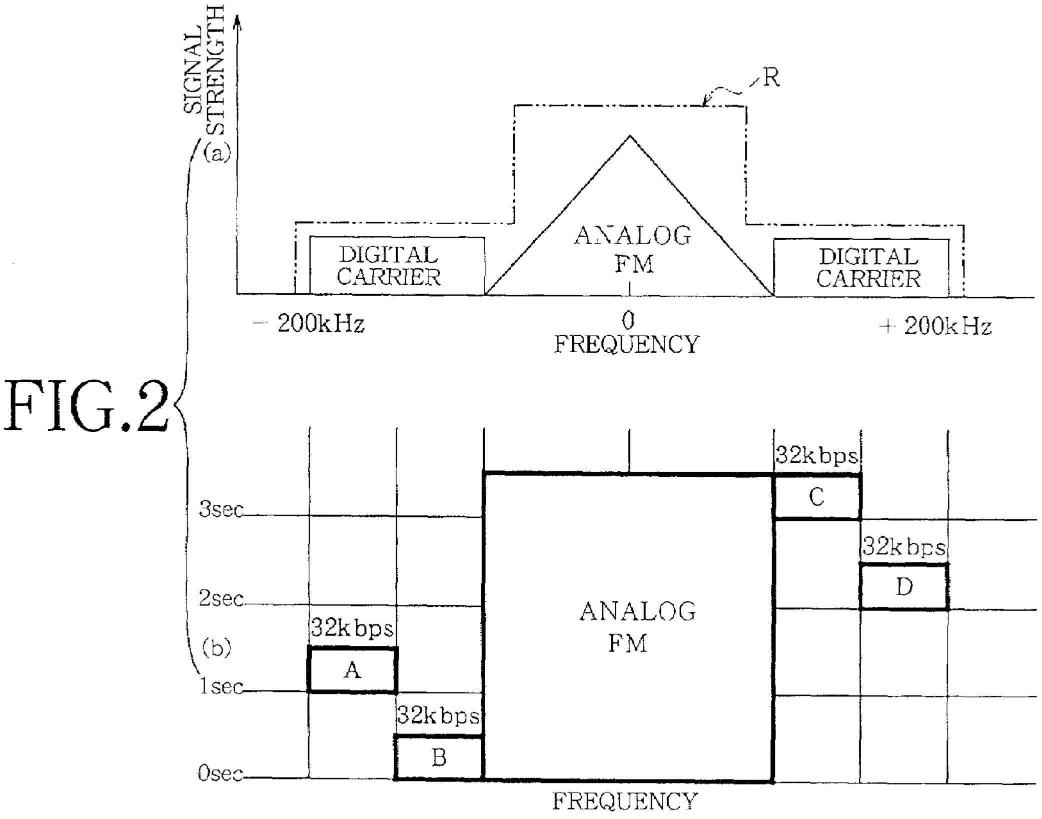
FIG. 2 is a diagram for illustrating the transmission spectrum format of a DAB system.

With reference to the drawings, a detailed description will be given of the present invention as embodied into a digital audio broadcast receiver (DAB receiver) for the DAB system shown in FIG. 2. As shown in FIG. 1, the DAB receiver of the invention comprises a tuner 1 for receiving audio broadcast signals, an A/D conversion circuit 2 for converting the received audio broadcast signal to digital data and a demodulator circuit 3 for demodulating the digital data obtained from the conversion circuit 2 to output the data as a digital audio signal. The receiver further comprises a control circuit 4 for controlling the operation of the tuner 1, A/D conversion circuit 2 and demodulator circuit 3, a memory 5 for storing various items of data and a search switch 6 to be manipulated by the user for searching for other broadcast stations of satisfactory reception condition.

Figure 3:
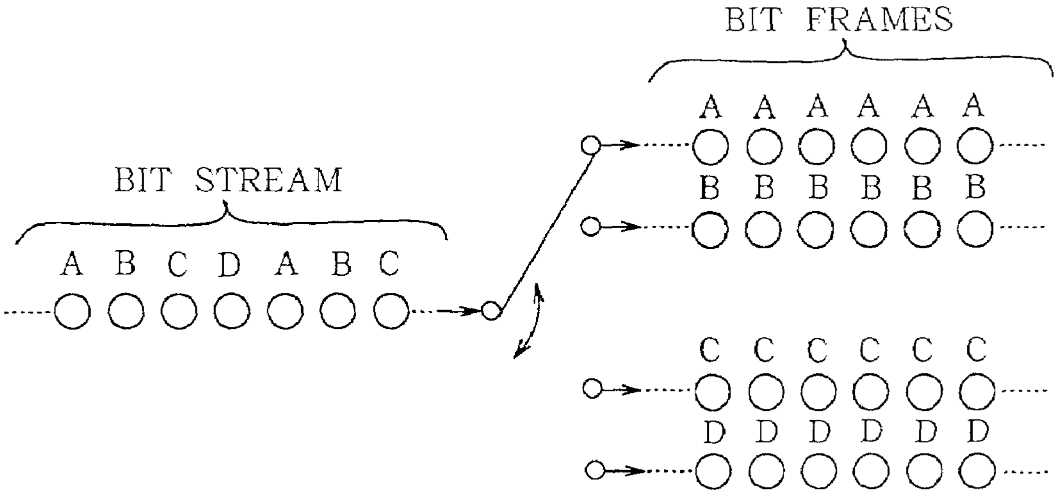
FIG. 3 is a diagram showing a single bit stream as divided into four bit frames.

The digital data obtained from the A/D conversion circuit 2 comprises four bit frames having the same contents as shown in FIG. 3. The demodulator circuit 3 usually demodulates these four bit frames, whereas when an impaired reception condition is detected as will be described later, the decoding of a predetermined bit frame (specified bit frame) is discontinued, and the remaining three bit frames are decoded to reproduce digital audio signal.

The free time resulting from the interruption of decoding of the bit frame is utilized to search for other broadcasting stations of satisfactory reception condition, and the station being received is changed over to another station of satisfactory reception condition in the event of impairment of reception condition.

Figure 4:
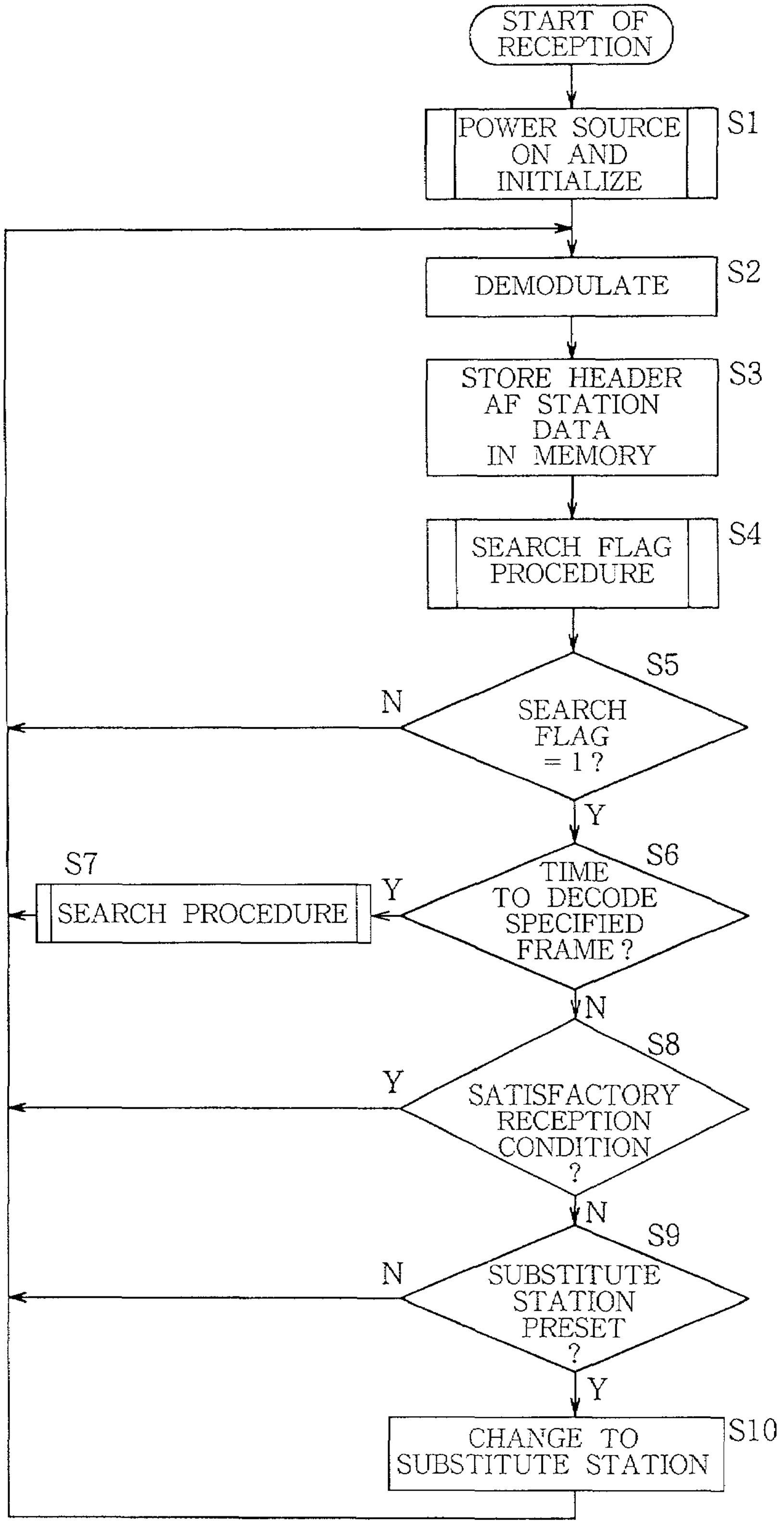
FIG. 4 is a flow chart showing the procedure to be performed by a control circuit of the DAB receiver of the invention.

FIG. 4 shows the control procedure to be performed by the control circuit 4. When the user manipulates a power source button, the power source is turned on in step S1 first for initialization. Subsequently, step S2 starts to demodulate digital data received. Reception frequency data as to substitute station (AF station) written in the header portion of demodulated digital data [see JP-A No. 7-231269(1995), No. 5-48395(1993)] is read and stored in a predetermined portion of the memory in step S3.

Figure 5:
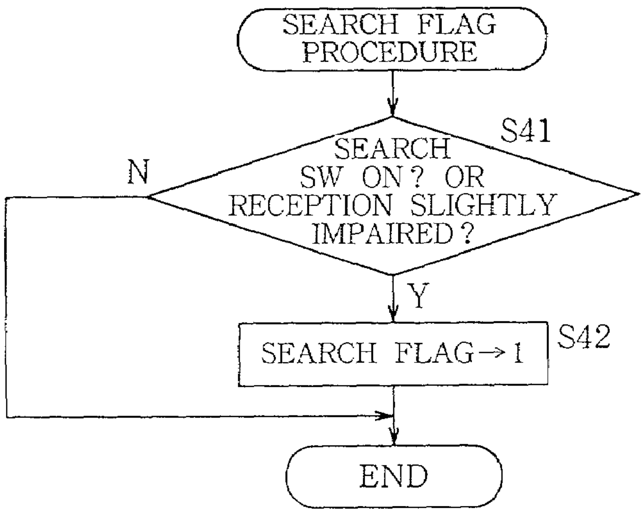
FIG. 5 is a flow chart showing a search flag procedure.

A search flag procedure shown in FIG. 5 is then executed in step S4. An inquiry is made in step S41 as to whether the search switch is turned on by the user or whether the reception condition has become impaired slightly. If the inquiry is answered in the affirmative, a search flag is set to "1" in step S42.

FIG. 4, step S5 thereafter inquires whether the search flag is "1." If the answer is negative, step S2 follows again to repeat the search flag procedure. When the answer to the inquiry of step S5 is affirmative, step S6 follows to inquire whether it is time to decode the specified frame.

Figure 6:
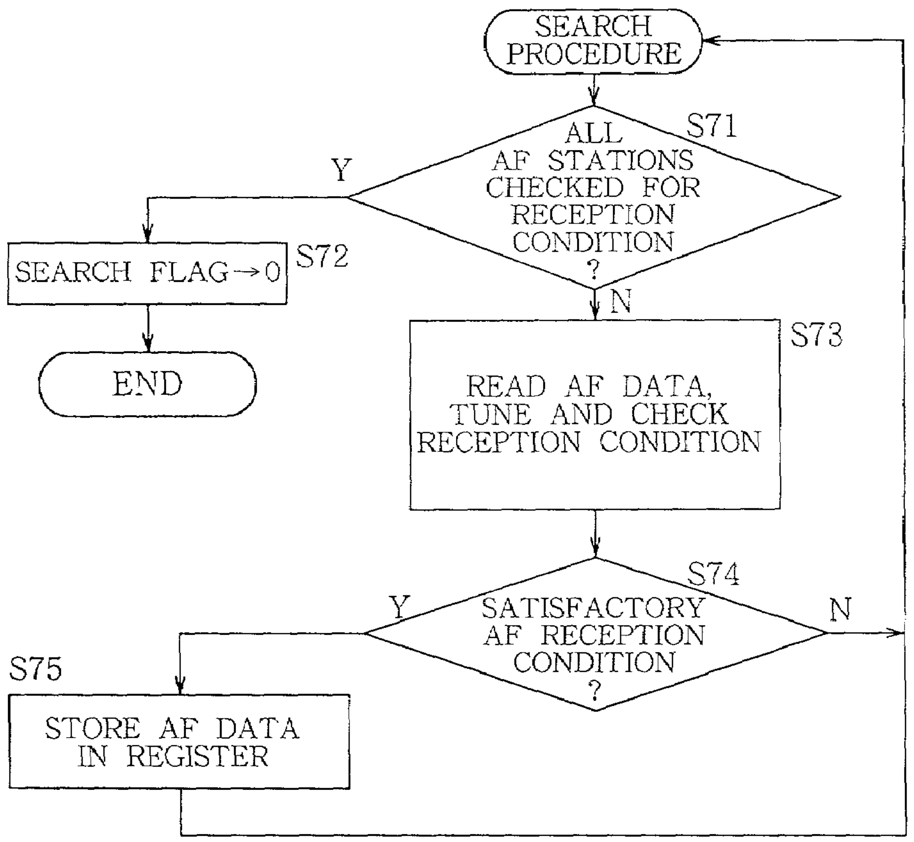
FIG. 6 is a flow chart showing a search procedure.

When the inquiry of step S6 is answered in the affirmative, step S7 follows to execute a search procedure shown in FIG. 6. An inquiry is made in step S71 as to whether all substitute stations have been completely checked for reception condition. If the answer is negative, the sequence proceeds to step S73, in which the reception frequency data (AF data) as to another substitute station is read, tuning to the frequency is made, and the reception condition is checked. Step S74 then inquires whether the reception condition is satisfactory. The acceptability of the reception condition can be determined by whether AGC (automatic gain control) data or error rate data as to the demodulated digital data is in excess of a predetermined threshold value.

When the answer to the inquiry of step S74 is affirmative, the reception frequency data (AF data) of the substitute station is stored in the register in step S75, whereupon the sequence returns to step S71. When the inquiry of step S71 is thereafter answered in the affirmative, the search flag is set to 0 in step S72, followed by step S2 of FIG. 4.

The search procedure described is performed within the time required for decoding one bit frame.

On the other hand, if the inquiry of FIG. 4, step S6 is answered in the negative, step S8 follows to inquire whether the reception condition is satisfactory. When the answer is negative, the sequence proceeds to sep S9 to inquire whether the reception frequency data as to substitute station is preset in the register. If the answer to the inquiry of step S9 is affirmative, the station being received is changed over to the substitute station in step S10, whereupon the sequence returns to step S2.

With the search switch held on in advance, or when the reception condition becomes slightly impaired with movement, other broadcasting stations which are satisfactory in reception condition are searched for. Upon the reception condition becoming impaired subsequently, the station being received is changed over to another station of good reception condition promptly. This relieves the user of the cumbersome procedure of searching for other station of satisfactory reception condition.

The search procedure shown in FIG. 6 registers as substitute stations the broadcasting stations of satisfactory reception condition which can be substituted for the station being received, and the station being received, when becoming impaired in reception condition, is changed over to the substitute station. This almost completely eliminates the discomfort involved in a change of contents of broadcast.

Figure 7:
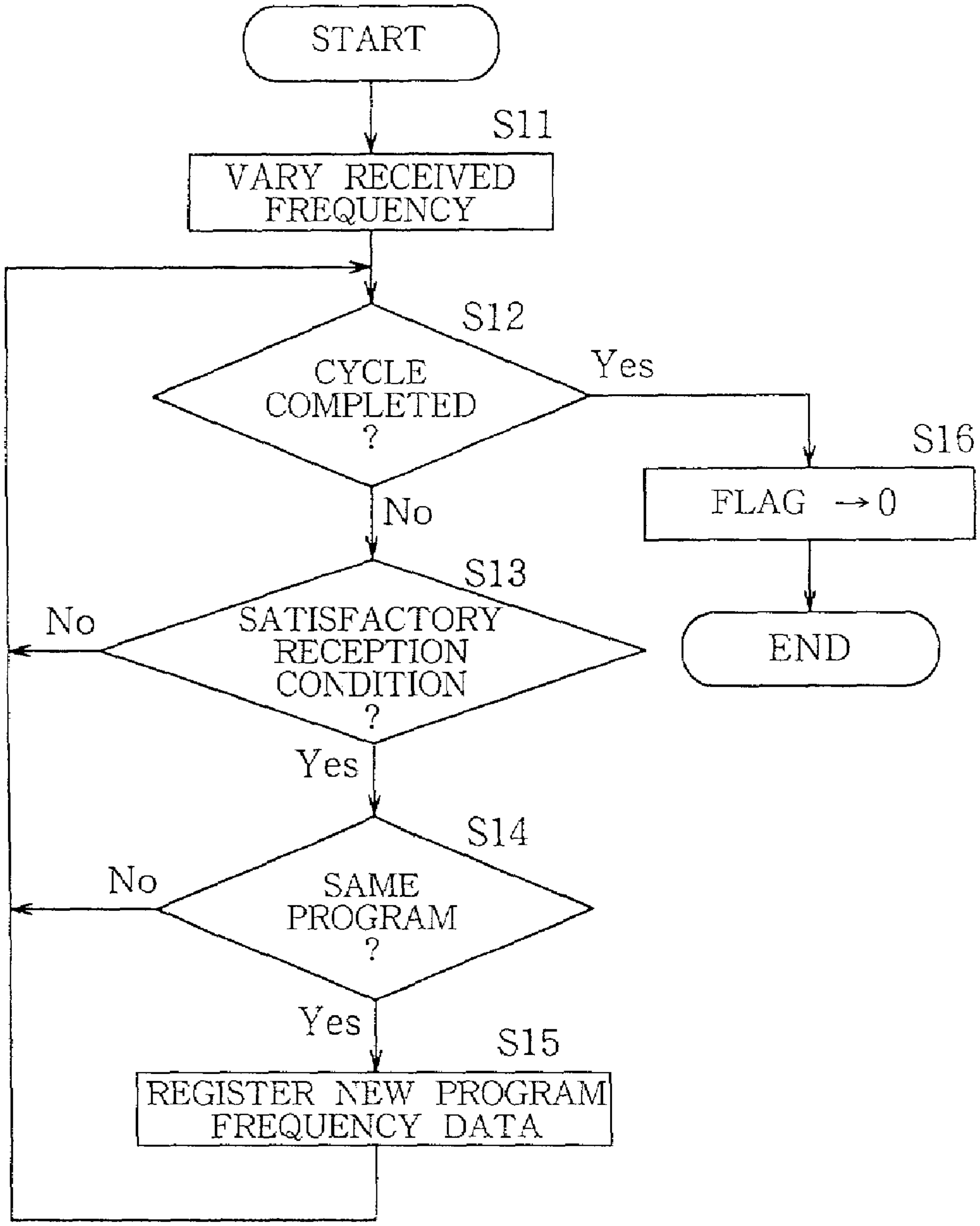
FIG. 7 is a flow chart showing another search procedure.

FIG. 7 shows a search procedure which can be performed when program identification data is written instead of substitute station in the header portion of the demodulated digital data. The received frequency is gradually varied in step S11, and step S12 inquires whether the frequency varying cycle has been completed. If the answer is negative, an inquiry is made in step S13 as to whether the reception condition is satisfactory.

If the answer to the inquiry of step S13 is affirmative, an inquiry is made in step S14 with reference to the program identification data as to whether the program received anew by varying the frequency is the same as the program preceding the variation. When the answer is affirmative, the frequency data as to the newly received program is stored in the register. When the inquiry of step S12 is thereafter answered in the affirmative, step S16 follows to set the flag to 0, whereupon the sequence returns to step S2 of FIG. 4.

A broadcasting station satisfactory in reception condition and broadcasting the same program as the station being received is registered as a substitute station by the search procedure shown in FIG. 7, and in the event of the reception condition becoming impaired, the station current being received is changed over to the substitute station, permitting the user to enjoy the same program continuously.

Although the search procedure is performed when the search switch is on or upon the reception condition becoming slightly impaired according to the procedure of FIG. 4, this is not limitative; the search procedure can be executed, for example, upon turning on the power source of the receiver, upon a changeover of selected station or upon a change of substitute station.

What is claimed is:

1. A receiver, comprising:

a tuner for selecting a desired broadcasting station from among a plurality of broadcasting stations and receiving a digital broadcast of the selected station, the digital broadcast having a transmission spectrum format which is prepared by dividing digital data comprising a single bit stream into a plurality of bit frames capable of holding the same contents as the original bit stream, allocating different carrier frequencies to the respective bit frames and arranging the bit frames on a frequency axis a demodulator circuit for decoding the plurality of bit frames constituting the received digital broadcast and outputting the decoded bit frames; and a control circuit for controlling the operation of the tuner and the demodulator circuit, the control circuit comprising:

decoding control means for stopping decoding at least one of the bit frames, with one broadcasting station selected, search means for searching for other broadcasting station or stations of satisfactory reception condition utilizing free time resulting from stopping decoding, and selected station changeover means for changing over the broadcasting station being selected for reception to the broadcasting station of satisfactory reception condition searched for.

2. A receiver for receiving a digital broadcast having a transmission spectrum format which is prepared by dividing digital data comprising a single bit stream into a plurality of bit frames capable of holding the same contents as the original bit stream, allocating different carrier frequencies to the respective bit frames and arranging the bit frames on a frequency axis, the digital broadcast receiver comprising a tuner for selecting the desired broadcasting station from among a plurality of broadcasting stations and receiving the digital broadcast of the selected station, a demodulator circuit for decoding a plurality of bit frames constituting the received digital broadcast and outputting the decoded bit frames and a control circuit for controlling the operation of the tuner and the demodulator circuit, the digital broadcast receiver being characterized in that the control circuit comprising:

decoding control means for stopping decoding at least one of the bit frames, with one broadcasting station selected, search means for searching for other broadcasting station or stations of satisfactory reception condition utilizing free time resulting from stopping decoding, and selected station changeover means for changing over the broadcasting station being selected for reception to the broadcasting station of satisfactory reception condition searched for, wherein the control circuit further comprises a sensor means for detecting an impaired reception condition, and changeover command means for bringing the decoding control means, the search means and the selected station changeover means into operation.

3. A digital broadcast receiver according to claim 2 wherein the control circuit further comprises register means for storing frequency data as to the other broadcasting stations of satisfactory reception condition searched for by the search means, and the changeover command means reads the frequency data as to one broadcasting station from the register means and operates the selected station changeover means.

4. A digital broadcast receiver according to claim 3 wherein the changeover command means of the control circuit operates the decoding control means and the search means in accordance with a manipulation by the user or when a slightly impaired reception condition is detected by the sensor means to cause the register means to store the result of search.

5. A receiver for receiving a digital broadcast having a transmission spectrum format which is prepared by dividing digital data comprising a single bit stream into a plurality of bit frames capable of holding the same contents as the original bit stream, allocating different carrier frequencies to the respective bit frames and arranging the bit frames on a frequency axis, the digital broadcast receiver comprising a tuner for selecting the desired broadcasting station from among a plurality of broadcasting stations and receiving the digital broadcast of the selected station, a demodulator circuit for decoding a plurality of bit frames constituting the received digital broadcast and outputting the decoded bit frames and a control circuit for controlling the operation of the tuner and the demodulator circuit, the digital broadcast receiver being characterized in that the control circuit comprising:

decoding control means for stopping decoding at least one of the bit frames, with one broadcasting station selected, search means for searching for other broadcasting station or stations of satisfactory reception condition utilizing free time resulting from stopping decoding, and selected station changeover means for changing over the broadcasting station being selected for reception to the broadcasting station of satisfactory reception condition searched for, wherein the control circuit further comprises memory means for storing received frequency data as to one or a plurality of substitute stations inserted in the broadcast signal being received, and the search means searches for the substitute station of satisfactory reception condition from among said one or plurality of substitute stations having the received frequency data stored in the memory means.

6. A receiver for receiving a digital broadcast having a transmission spectrum format which is prepared by dividing digital data comprising a single bit stream into a plurality of bit frames capable of holding the same contents as the original bit stream, allocating different carrier frequencies to the respective bit frames and arranging the bit frames on a frequency axis, the digital broadcast receiver comprising a tuner for selecting the desired broadcasting station from among a plurality of broadcasting stations and receiving the digital broadcast of the selected station, a demodulator circuit for decoding a plurality of bit frames constituting the received digital broadcast and outputting the decoded bit frames and a control circuit for controlling the operation of the tuner and the demodulator circuit, the digital broadcast receiver being characterized in that the control circuit comprising:

decoding control means for stopping decoding at least one of the bit frames, with one broadcasting station selected, search means for searching for other broadcasting station or stations of satisfactory reception condition utilizing free time resulting from stopping decoding, and selected station changeover means for changing over the broadcasting station being selected for reception to the broadcasting station of satisfactory reception condition searched for, wherein the control circuit further comprises station sensor means for detecting other broadcasting station or stations broadcasting the same program as that being broadcast based on program identifying data inserted in the broadcast signal being received, and memory means for storing received frequency data as to the other broadcasting station or stations detected, and the search means searches for the broadcasting station of satisfactory reception condition from among the broadcasting station or stations having the received frequency data stored in the memory means.

7. A receiver for receiving a digital broadcast having a transmission spectrum format which is prepared by dividing digital data comprising a single bit stream into a plurality of bit frames capable of holding the same contents as the original bit stream, allocating different carrier frequencies to the respective bit frames and arranging the bit frames on a frequency axis, the digital broadcast receiver comprising a tuner for selecting the desired broadcasting station from among a plurality of broadcasting stations and receiving the digital broadcast of the selected station, a demodulator circuit for decoding a plurality of bit frames constituting the received digital broadcast and outputting the decoded bit frames and a control circuit for controlling the operation of the tuner and the demodulator circuit, the digital broadcast receiver being characterized in that the control circuit comprising:

decoding control means stopping decoding at least one of the bit frames while not stopping decoding another one of the bit frames, with one broadcasting station selected, search means searching for other broadcasting station or stations of satisfactory reception condition utilizing free time resulting from stopping decoding, and selected station changeover means changing over the broadcasting station being selected for reception to the broadcasting station of satisfactory reception condition searched for.

* * * * *